(12) United States Patent
Schmalz et al.

(10) Patent No.: US 7,661,736 B2
(45) Date of Patent: Feb. 16, 2010

(54) UNDERPRESSURE SURFACE GRIPPING DEVICE

(75) Inventors: Kurt Schmalz, Dornstetten (DE); Thomas Eisele, Fluorn-Winzeln (DE); Leonhard Harter, Loßburg-Wittendorf (DE)

(73) Assignee: J. Schmalz GmbH, Glatten (DE)

( * ) Notice: Subject to any disclaimer, the term of this patent is extended or adjusted under 35 U.S.C. 154(b) by 365 days.

(21) Appl. No.: 11/717,653

(22) Filed: Mar. 14, 2007

(65) Prior Publication Data

US 2008/0129062 A1    Jun. 5, 2008

(30) Foreign Application Priority Data

Mar. 15, 2006   (DE) .................. 10 2006 013 970

(51) Int. Cl.
*B25J 15/06* (2006.01)
(52) U.S. Cl. ........................................ 294/64.1; 901/40
(58) Field of Classification Search ................ 294/64.1; 901/40; 414/627, 737; 269/21
See application file for complete search history.

(56) References Cited

U.S. PATENT DOCUMENTS

| | | | | |
|---|---|---|---|---|
| 3,743,340 A | * | 7/1973 | Williamann | 294/64.1 |
| 4,265,476 A | * | 5/1981 | Elgart | 294/64.1 |
| 4,674,785 A | * | 6/1987 | Riesenberg | 294/65 |
| 4,925,225 A | * | 5/1990 | Dost | 294/64.1 |
| 7,181,854 B2 | * | 2/2007 | Long et al. | 33/286 |
| 2004/0212205 A1 | * | 10/2004 | Linker et al. | 294/64.1 |

FOREIGN PATENT DOCUMENTS

| | | |
|---|---|---|
| DE | 198 12 275 | 9/1999 |
| DE | 102 16 221 | 10/2003 |
| DE | 10 2004 037 609 | 2/2006 |

* cited by examiner

*Primary Examiner*—Dean J Kramer
(74) *Attorney, Agent, or Firm*—Paul Vincent

(57) ABSTRACT

The invention concerns an underpressure surface gripping device with an extruded profile having a hollow chamber, a vacuum plate which is mounted parallel to the extruded profile, at least one flow through opening which connects the extruded profile to the vacuum plate, and with an ejector as a vacuum generator, wherein the ejector is inserted into the hollow chamber of the extruded profile and the suction opening of the ejector communicates with the flow through opening.

17 Claims, 2 Drawing Sheets

UNDERPRESSURE SURFACE GRIPPING DEVICE

This application claims Paris Convention priority of DE 10 2006 013 970 filed on Mar. 15, 2006.

BACKGROUND OF THE INVENTION

The invention concerns an underpressure surface gripping device comprising an extruded profile, a vacuum plate which is mounted parallel to the extruded profile, at least one flow through opening that connects the extruded profile to the vacuum plate, and an ejector as a vacuum generator.

Conventional underpressure surface griping devices of this type are e.g. produced by the companies Joulin and Tepro. A vacuum surface gripping system due to the Assignee is designated "FX". In this vacuum surface gripping system, a vacuum generator and its mufflers are disposed on a holding plate. This holding plate also includes a structural valve component and a vacuum display. A vacuum plate is also mounted to the lower side of the holding plate for gripping the tool using vacuum. The overall device is mounted to a robot arm via a mounting bracket which extends over the components mounted to the holding plate, such that the workpiece which is gripped by the vacuum surface gripping system can be lifted and moved to another location. A vacuum surface gripper system of this type has, however, a large height, since the components such as vacuum generator, mufflers and the like are mounted to the holding plate. Due to the large height, the surface gripper system generates a large lever arm on the robot flange, which must always be taken into consideration in handling the workpiece. DE 10 2004 037 609 B3 discloses a vacuum beam which comprises an extruded profile containing a pre-storage chamber and a suction chamber. All functional parts are housed in the extruded profile. This vacuum beam is advantageous in that the functional parts are no longer provided on the outer side of the profile. However, the dimensions of the vacuum beam are still excessively large.

SUMMARY OF THE INVENTION

It is therefore the underlying purpose of the invention to provide an underpressure surface gripping device having a smaller size, thereby reducing the separation between the workpiece and the robot flange.

This object is achieved in accordance with the invention in an underpressure surface gripping device of the above-mentioned type in that the extruded profile has one single hollow chamber, the ejector is inserted into the hollow chamber of the extruded profile, and the suction opening of the ejector communicates with the flow through opening.

Since the ejector is integrated in the extruded profile, the flange for the robot arm can be mounted directly onto the upper side of the extruded profile. Since this side is opposite to the vacuum plate and the workpiece abuts the vacuum plate, the lever arm between the workpiece and the flange of the robot arm is determined by the thickness of the extruded profile with mounted vacuum plate. The thickness of the extruded profile is selected to accept the ejector without housing, since the extruded profile itself forms the housing. Since an ejector without housing is smaller than an ejector with housing, the lever arm is reduced in length. Due to the smaller lever arm, the same robot arm can grasp and move workpieces of a larger weight.

In a further development, the pressure connection of the ejector terminates in a lid that closes the end face of the extruded profile. The pressure hose for the pressure medium is connected to this lid for operating the ejector. For this reason, the extruded profile needs no separate connecting devices or corresponding provisions.

The lid may additionally serve as a positioning element and/or a holder for the ejector. The ejector is positioned and/or fixed after insertion into the hollow chamber of the extruded profile through mounting the lid to the end face of the extruded profile. The length of the extruded profile can also be neglected as long as it is at least sufficiently long to receive the ejector. The underpressure surface gripping device can thereby be advantageously adjusted to the optimum size for the workpiece to be handled simply through cutting the extruded profile to the desired length. The extruded profile must only be closed on the end faces by lids, and the vacuum plate must be mounted, in particular, screwed. Several vacuum plates may be used, together in tandem. Several extruded profiles can be advantageously connected in tandem via suitable couplings, i.e. couplings that transmit the bending moment and have seals, such that an underpressure surface gripping device having the desired size can be built in a modular fashion.

The outlet of the ejector preferably opens from a lid which closes the end face of the extruded profile. This may be the same lid to which the ejector is mounted and via which the ejector is mounted to the extruded profile. The opposite lid may also be used. The outgoing ejector air is guided in the hollow chamber of the extruded profile e.g. via hoses to the lids having the outlet opening. The outlet of the ejector or the free end of the hose may thereby be guided into a foamed material which serves as a muffler and through which the outgoing air flows. This foamed material is also housed in the hollow chamber of the extruded profile. In this case, the extruded profile itself also serves as a housing for the muffler, wherein the foamed material represents the damping material.

The ejector advantageously abuts the inner wall of the extruded profile having the flow through opening in a fluid tight fashion. The vacuum generated by the ejector thereby directly abuts the vacuum plate, which reduces the reaction time and the air consumption due to the smaller dead volume. The ejector is thereby dimensioned such that it is received by the hollow chamber of the extruded profile without play and advantageously has a seal on the side facing the flow through openings.

The hollow chamber of the extruded profile may moreover contain further components such as switching valves, pressure monitoring means, further lines for underpressure and overpressure and control pressure and the like. The hollow chamber may also contain all electronic components which are required to drive the ejector, monitor the pressures, store data, or transmit and receive information.

Further advantages, features and details of the invention can be extracted from the dependent claims and the following description which describes in detail a particularly preferred embodiment with reference to the drawing. The features shown in the drawing and mentioned in the description and the claims may thereby be essential to the invention either individually or collectively in arbitrary combination.

DESCRIPTION OF THE PREFERRED EMBODIMENT

Figure 1:
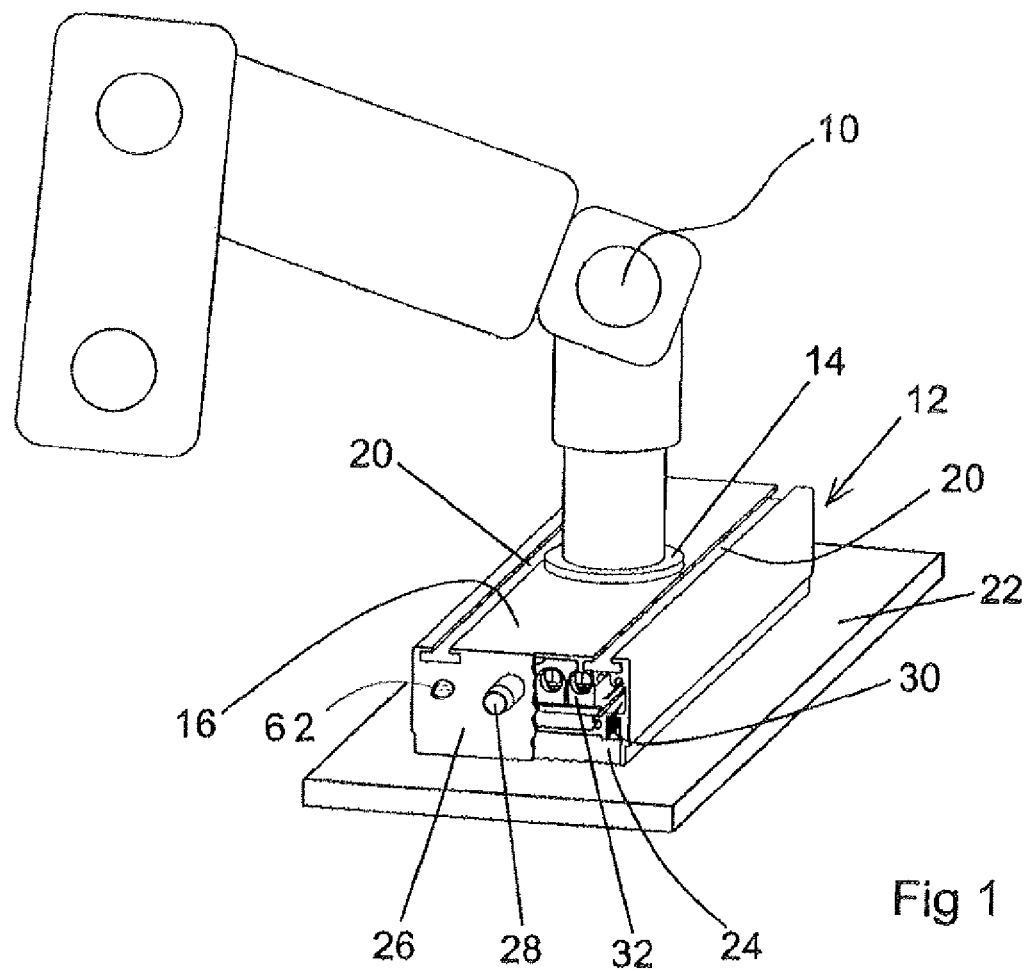
FIG. 1 shows a perspective view of an underpressure surface gripping device which is flanged to a robot arm.

FIG. 1 shows a perspective view of a section of a robot arm, designated in total with 10, to which an underpressure surface gripping device 12 is flanged. Towards this end, the robot arm 10 has a flange 14 which directly abuts the upper side 16 of an extruded profile 18, i.e. without interconnection of mounting brackets or the like. It is e.g. screwed or clamped to the upper side 16. For mounting other flanges, the extruded profile 18 has holding grooves 20 on its upper side 16, into which e.g. guides of a corresponding other flange can be inserted, and the flange can be clamped to the upper side 16 at any location.

FIG. 1 also shows a workpiece 22 which is suctioned by the underpressure surface gripping device 12 via a vacuum plate 24. An end face of the extruded profile 18 is closed by a lid 26 which is broken away in the illustration. A pressure connection 28 projects from the lid 26 and is guided to an ejector 32 which is disposed in the hollow chamber 30 of the extruded profile 18. The lid 26 has electrical connections 62.

Figure 2:
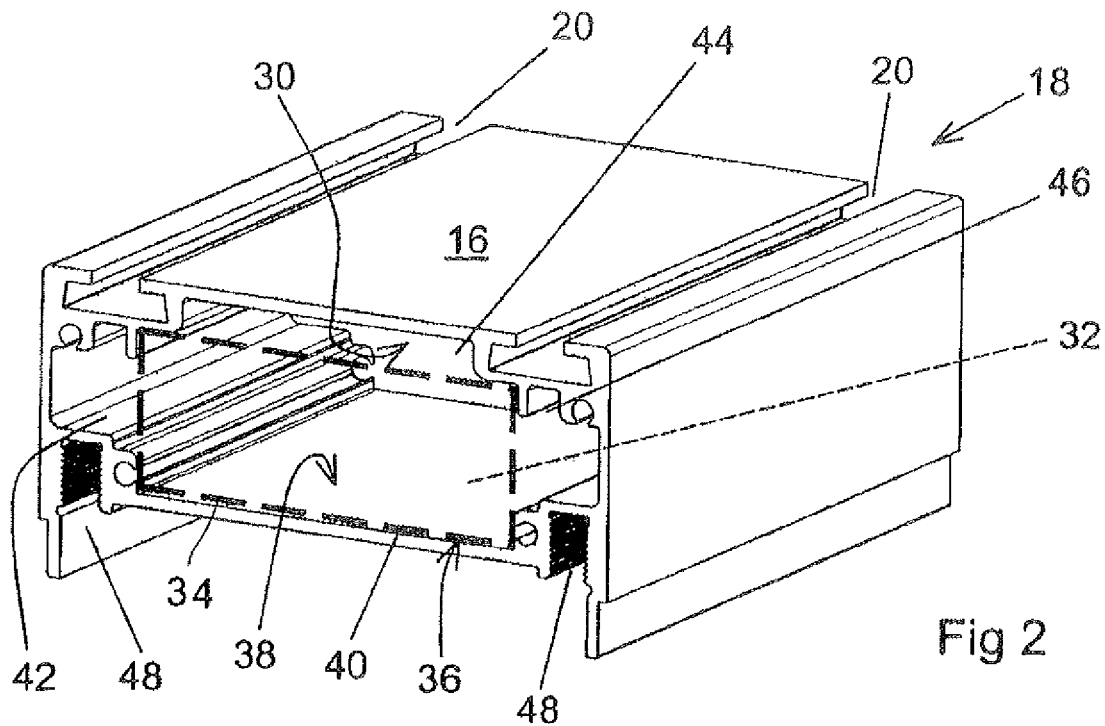
FIG. 2 shows a section of an extruded profile of the underpressure surface gripping device.

FIG. 2 shows the extruded profile 18 in the hollow chamber 30 of which the ejector 32 is housed (indicated with dashed lines 34). The ejector 32 is fitted into the hollow chamber 30 such that its lower side 36 is supported on the inner surface 38 of the lower longitudinal wall 40 of the extruded profile 18 in a fluid-tight fashion. For sealing, the lower side 36 of the ejector 32 may e.g. be laminated with a sealing coating. The ejector 32 is also surrounded on both sides and at the top by further hollow spaces 42, 44 and 46 which extend in the longitudinal direction, and can be used to receive electric lines or pneumatic lines or guide pressurized or vacuumized fluids. The figure also shows that screw channels 48 are provided opposite to the holding grooves 20, into which screws can be screwed for mounting the vacuum plate 24 to the extruded profile 18.

Figure 3:
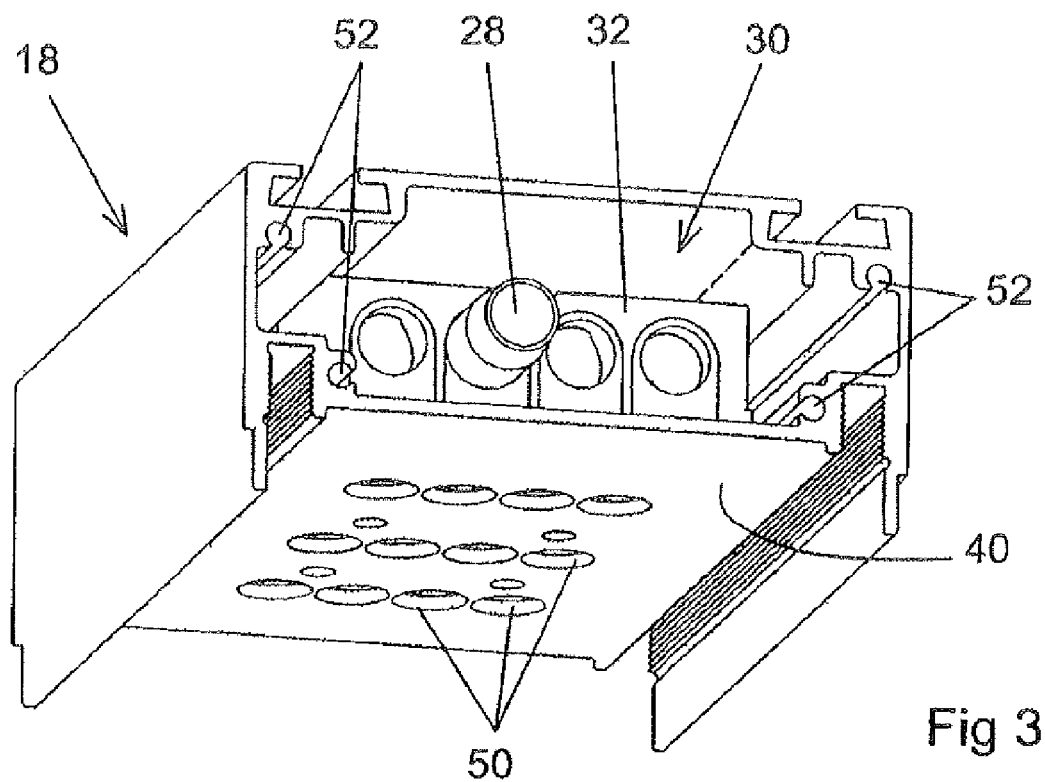
FIG. 3 shows a view of the lower side of the extruded profile with inserted ejector.

FIG. 3 shows that the longitudinal wall 40 has flow through openings 50 which connect the hollow chamber 30 of the extruded profile 18 to the vacuum plate 24 (not shown). The ejector 32 is located in the hollow chamber 30 whose suction opening or suction openings communicate with the flow through openings 50. In this fashion, the ejector 32 suctions air directly via the flow through opening 50 from the area located beneath 54.

Figure 4:
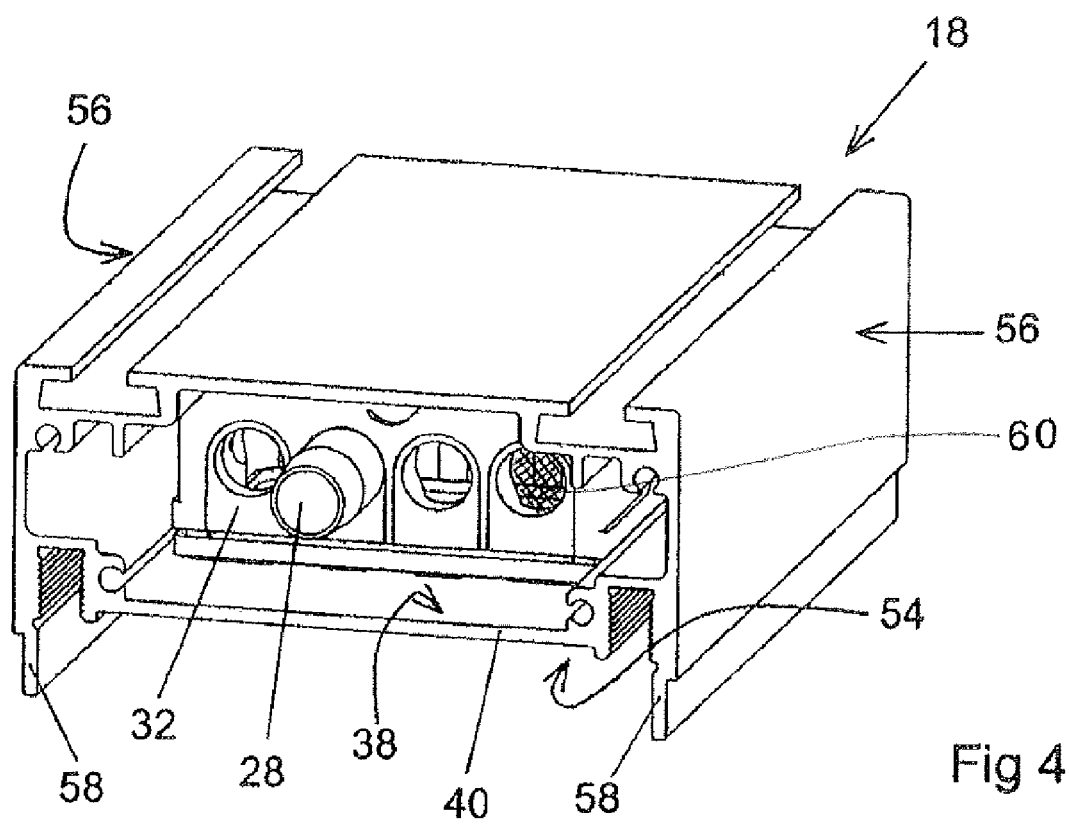
FIG. 4 shows a view of the upper side of the extruded profile with inserted ejector.

FIG. 4 shows that the ejector 32 directly seats on the inner surface 38 of the longitudinal wall 40, such that the dead volume between the ejector 32 and the flow valves (not shown) in the vacuum plate 24 is minimum in order to minimize the air consumption. Moreover, due to the smaller dead volume, the underpressure surface gripping device 12 reacts faster and the workpiece 20 is suctioned more quickly.

At least one of the flow through openings 50 can be connected to the outlet of the ejector 32, such that the vacuum plate 24 is also ventilated and ejection of the workpiece 22 can be accelerated. The lid 26 is mounted to the extruded profile 18 via screws which are screwed into the screw channels 52.

FIG. 4 shows that the side walls 56 of the extruded profile 18 are downwardly elongated, i.e. in the direction towards the vacuum plate 24, and the free sections 58 and the longitudinal wall 40 form a downwardly open U-shaped profile which surrounds the area 54. As soon as the vacuum plate 24 is mounted, the area 54 forms a vacuum storage for the vacuum plate 24 which is directly behind the flow valves provided in the vacuum plate 24.

It is clearly shown that due to the integration of the ejector 32 and all other components, such as controls, valves, electric and pneumatic lines and the like in the hollow chamber 30 of the extruded profile 18, the separation between the vacuum plate 24 and the flange 14 of the robot arm 10 is reduced to a minimum. This reduces the length of the lever arm such that heavy workpieces 22 can be moved by the robot arm 10. A foamed material 60, through which outgoing air flows, is disposed in the hollow chamber 30, between the outlet and the lid 26.

We claim:

1. An underpressure surface gripping device comprising:
   an extruded profile having one single hollow chamber;
   a vacuum plate, mounted parallel to said extruded profile;
   means defining at least one flow through opening to connect said extruded profile to said vacuum plate; and
   vacuum generator ejector, said ejector being inserted into said hollow chamber of said extruded profile, wherein a suction opening of said ejector communicates with said flow through opening, a pressure connection of said ejector opening from a lid closing an end face of said extruded profile or said pressure connection communicating with a connection provided in said lid, wherein said lid serves to align and/or hold said ejector.

2. The underpressure surface gripping device of claim 1, wherein said extruded profile forms a housing of said ejector.

3. The underpressure surface gripping device of claim 1, wherein said ejector abuts, in a fluid-tight fashion, an inner wall of said extruded profile defining said flow through opening.

4. The underpressure surface gripping device of claim 1, wherein a side of said extruded profile opposite to said vacuum plate forms an abutment surface for a flange of a robot arm.

5. The underpressure surface gripping device of claim 1, wherein said extruded profile has side walls which are continued in a direction towards said vacuum plate to form a U-shaped profile which opens downwardly towards said vacuum plate.

6. The underpressure surface gripping device of claim 5, wherein said downwardly opening U-shaped profile is closed by said vacuum plate.

7. The underpressure surface gripping device of claim 5, wherein said downwardly opening U-shaped profile and said vacuum plate form a vacuum storage.

8. The underpressure surface gripping device of claim 1, wherein said lid has pneumatic and electric connections.

9. An underpressure surface gripping device comprising:
   an extruded profile having one single hollow chamber;
   a vacuum plate, mounted parallel to said extruded profile;
   means defining at least one flow through opening to connect said extruded profile to said vacuum plate; and
   vacuum generator ejector, said ejector being inserted into said hollow chamber of said extruded profile, wherein a suction opening of said ejector communicates with said flow through opening, an outlet of said ejector opening from a lid which closes an end face of said extruded profile.

10. The underpressure surface gripping device of claim 9, wherein a foamed material, through which outgoing air flows, is disposed in said hollow chamber between an outlet and said lid.

11. The underpressure surface gripping device of claim 9, wherein said extruded profile forms a housing of said ejector.

12. The underpressure surface gripping device of claim 9, wherein said ejector abuts, in a fluid-tight fashion, an inner wall of said extruded profile defining said flow through opening.

13. The underpressure surface gripping device of claim 9, wherein a side of said extruded profile opposite to said vacuum plate forms an abutment surface for a flange of a robot arm.

14. The underpressure surface gripping device of claim 9, wherein said extruded profile has side walls which are continued in a direction towards said vacuum plate to form a U-shaped profile which opens downwardly towards said vacuum plate.

15. The underpressure surface gripping device of claim 14, wherein said downwardly opening U-shaped profile is closed by said vacuum plate.

16. The underpressure surface gripping device of claim 14, wherein said downwardly opening U-shaped profile and said vacuum plate form a vacuum storage.

17. The underpressure surface gripping device of claim 9, wherein said lid has pneumatic and electric connections.

* * * * *